Dec. 3, 1929.                B. C. COMFORT                 1,738,232
                              RADIOCIRCUIT
                            Filed July 2, 1928
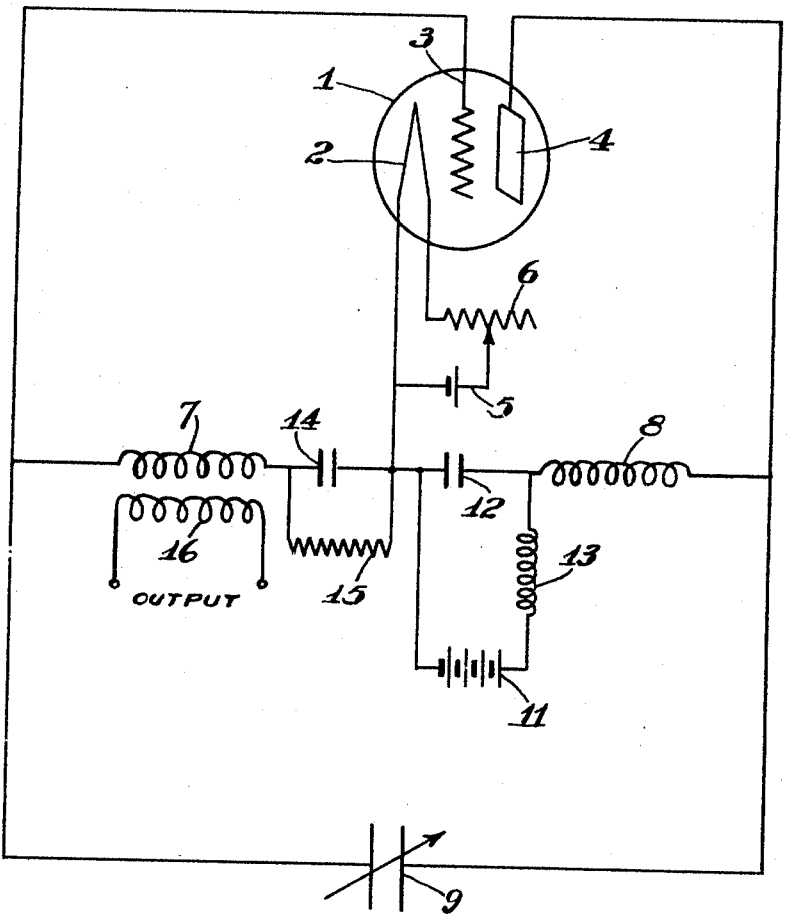
WITNESSES                                              INVENTOR:

Patented Dec. 3, 1929

1,738,232

UNITED STATES PATENT OFFICE

BEN C. COMFORT, OF VERSAILLES BOROUGH, PENNSYLVANIA

RADIOCIRCUIT

Application filed July 2, 1928. Serial No. 289,759.

The invention relates to the generation of high frequency oscillations in a radio circuit of the type in which a multiple electrode vacuum tube or discharge device is utilized as a generator.

In generating high frequency oscillating currents in radio circuits as ordinarily accomplished today, a multiple electrode vacuum tube or space discharge device with its appropriate source of direct current energy is connected to an oscillatory circuit having a feed back connection whereby the flow of energy through the generator is controlled, and energy is supplied to the oscillatory circuit.

It is well known that there are a number of ways in which a generator of the above described character may be connected in an oscillatory circuit, and that the organization of the elements comprising such circuits have been very highly developed. Nevertheless it is a well recognized fact that the efficiency of circuits of this character may be considerably improved. Among the most prevalent losses occurring in systems for generating high frequency oscillating currents are those incurred when spurious circuits are set up between the different elements going to make up the oscillatory circuit, and the elements comprising a generating circuit.

It is an object of this invention to provide for generating high frequency oscillating currents in a generating system wherein the usual spurious circuits encountered in such a system are reduced and the efficiency of the system increased.

A more special object of the invention is to provide a high frequency generating system embodying the above noted features for regulating or varying the frequency of the oscillations in the oscillatory circuit by means of a single variable element.

The novel features which characterize this invention, its advantages, its organization, and its method of operation will be better understood when the following detailed description is read in conjunction with the accompanying drawing, in which the single figure shown is a diagrammatic illustration of a high frequency generating system embodying the invention.

Referring to the drawing, there is shown an oscillation generator in the form of a three-electrode vacuum tube or space discharge device 1 consisting of a cathode or filament 2, a control electrode or grid 3 and a plate or anode 4. A filament heating battery 5, together with a filament control resistance 6, are provided. The generator 1 is connected to an oscillatory circuit comprising a pair of inductance elements or coils 7 and 8 and a variable capacity element or condenser 9. The inductance element or coil 7 and the inductance element or coil 8 are connected to control electrode or grid 3 and plate or anode 4, respectively; and the inductance elements are preferably magnetically coupled together. The terminals of variable condenser 9 also are connected to the terminals of grid 3 and plate 4, respectively, of the vacuum generator 1.

A suitable source of direct current or space current for the generator is in this instance provided by a battery 11 which is connected in series circuit relation with plate 4 of the generator, the positive terminal of the source being connected to inductance coil 8, and the negative terminal to the filament or cathode 2. In order to provide means for by-passing the high frequency currents in the oscillatory circuit around the B battery, a comparatively large capacity fixed condenser 12 is connected in parallel circuit relation with battery 11. It is well known that capacity elements offer but little, if any, resistance to high frequency currents, while an element in the nature of a B battery offers considerable resistance. Consequently, substantially no current will pass through a B battery when connected in a circuit in this manner. To further increase the high frequency resistance of the B battery circuit to eliminate passage of high frequency currents therethrough, a high frequency choke coil 13 may be connected in series circuit relation with the battery and in parallel circuit relation to fixed condenser 9. In order to prevent current from the direct current source of energy passing onto the control electrode or grid of the generator a comparatively large capacity element or fixed condenser 14 is connected in the oscillatory circuit in series circuit relation with inductance coil 7 and fixed condenser 12. As referred to previously in connection with condenser 12, capacity element 14 offers substantially no resistance to the oscillating currents flowing in the oscillatory circuit.

In accordance with the invention, inductance elements 7 and 8 and the fixed capacity elements or condensers 12 and 14 are so proportioned that a nodal point is obtained in the oscillatory circuit at a point substantially between the adjoining terminals of fixed condensers 12 and 14 to which point the cathode or filament element 2 of the generator in common with the negative terminal of battery 11 are connected. Consequently such a proportion makes the nodal point of the circuit referred to at substantially equal potential distances from the control electrode or grid 3 and the plate or anode 4, thereby substantially preventing the occurring of auxiliary or spurious oscillating currents being set up between these elements.

It will be further recognized that the frequency of the oscillating circuit, which is directly dependent upon the inductance and capacity values therein, may be readily changed by varying the capacity of variable condenser 9, and inasmuch as it is in parallel relation with all of the other elements of the circuit any variations that may be made in it will in no way substantially disturb the nodal point in the circuit to which the cathode of the generator is connected.

In accordance with the well known characteristics of such tubes, it is necessary to provide means for properly regulating the electrical charges imposed upon the control electrode or grid 3. In conformance with the usual practice in this circuit this is accomplished by providing a high resistance grid leak 15 which is connected in series circuit relation to the filament and the grid; and, in order that losses due to high frequency currents that may pass through the leak may be avoided, the grid leak is connected across the fixed condenser 14 which is connected in the oscillatory circuit across the terminals of which substantially no difference of high frequency potential occurs.

It has been found after considerable experimentation that a high frequency generating system having its elements organized in accordance with the circuit illustrated has its efficiency increased many fold. It has also been found that with the circuit here shown it is not necessary to provide a tube of special construction, but that an ordinary tube of the type referred to above gives equally good results. The output from a circuit of this kind may be taken from a secondary coil, such as inductance coil 16, which may be an antenna or other similar element associated in magnetic relation with inductance element 7. The circuit diagrammatically shown in the accompanying drawing illustrates the exact arrangement with which unusual results have been obtained, but it will be realized that some small modifications may be possible without detriment to the efficiency and stability of the system.

According to the provisions of the patent statutes, I have explained the principle and operation of my invention, and have illustrated and described what I now consider to represent its best embodiment. However, I desire to have it understood that, within the scope of the appended claims, the invention may be practiced otherwise than as specifically shown and described.

I claim:

1. In a high frequency generator, a three electrode vacuum tube comprising a cathode, an anode and a control electrode, an oscillating circuit comprising inductance and capacity, said anode and control electrode being connected to points in said oscillating circuit of unequal high frequency potential, said cathode being connected to a point in said oscillatory circuit having a potential intermediate those of said anode and electrode, a source of direct current having its negative terminal connected to said cathode and its positive terminal connected to said oscillatory circuit which is at substantially the same high frequency potential as the point to which said cathode is connected, said source of direct current being included in a direct current circuit between said anode and said cathode, a fixed condenser included in said circuit between said control electrode and said cathode, a high resistance included in said circuit in parallel current circuit relation with said condenser, a second fixed condenser connected in parallel current circuit relation with said source of direct current, and a variable condenser connected in said oscillatory circuit to said anode and said electrode for tuning said circuit.

2. In a high frequency generator, a three electrode vacuum tube comprising a cathode, an anode and a control electrode, an oscillating circuit comprising two inductance elements, two substantially equal fixed capacity elements and a variable capacity element for tuning the circuit all in series circuit relation, said anode being connected to said oscillatory circuit at a point between one of said inductance elements and one side of said variable capacity element, said control electrode being connected to a point in said oscillatory circuit between the other of said inductance elements and the other side of said variable capacity element, said fixed capacity elements being connected between said inductance elements, said elements being so proportioned that a high frequency nodal point is located in said circuit substantially midway between said fixed capacity elements, said cathode being connected in said circuit at said point, a source of direct current having its negative terminal connected to said cathode and its positive terminal connected to the inductance element connected to said anode at a point in said circuit which is of substantially equal high frequency potential to said nodal point, and said source of direct current being also connected in parallel circuit relation with one of said fixed capacity elements, whereby the high frequency currents are passed through said source of current, and a high resistance connected in parallel circuit relation with said other fixed capacity element whereby electrical charges collecting on said electrode can pass to said cathode.

3. In a high frequency generator, a vacuum tube comprising a cathode, an anode and a control electrode, a variable condenser connected in series circuit relation between the terminals of said anode and control electrode, a plurality of inductance elements and fixed capacity elements also connected in series circuit relation between the terminals of said anode and control electrode and in parallel circuit relation to said variable condenser, said cathode being connected to the circuit including said fixed capacity elements at a point between said elements and at a nodal point in said circuit, a high resistance grid leak having one terminal connected to the adjoining terminals of said fixed capacity elements and the other terminal connected to the other terminal of the fixed capacity element connected to the control electrode, the points of connection of said resistance terminals being substantially of equal high frequency potential, a direct current source also having its negative terminal connected to the adjoining terminals of said fixed capacity elements, a high frequency choke coil having one terminal connected to the positive terminal of said direct current source, and the other terminal connected to the other terminal of said fixed capacity element connected to said anode, the points of connection of said direct current source terminals being of substantially equal high frequency potential and in direct current circuit relation between said cathode and anode.

4. In a high frequency generator, a vacuum tube comprising a cathode, an anode and a control electrode; an oscillatory circuit consisting of an inductive element, two comparatively large fixed capacity elements, another inductive element, and a variable capacity element connected in series circuit relation in the order named, said variable capacity element providing a unitary tuning means for the circuit; said anode being connected to said oscillatory circuit at a point between adjacent terminals of one of said inductance elements and said variable capacity, said control electrode being connected to said oscillatory circuit at a point between adjacent terminals of the other inductance element and said variable capacity element, said fixed capacity element and said inductance elements being so proportioned that a high frequency nodal point is located in said oscillatory circuit substantially between the adjoining terminals of said fixed capacity elements, said cathode being connected to said oscillatory circuit at said nodal point, a source of direct current having its negative terminal connected to said cathode and its positive terminal connected to the terminal of said fixed capacity element in series with said anode, and means connected in series with said control electrode for controlling the electrical charges thereon.

In testimony whereof, I sign my name.

BEN C. COMFORT.